Nov. 1, 1966
S. B. FIELD ET AL
3,282,239
PASSIVE SHIP STABILIZATION SYSTEM USING
DAMPING ALONG CENTER LINE ONLY
Filed July 30, 1964
3 Sheets-Sheet 1
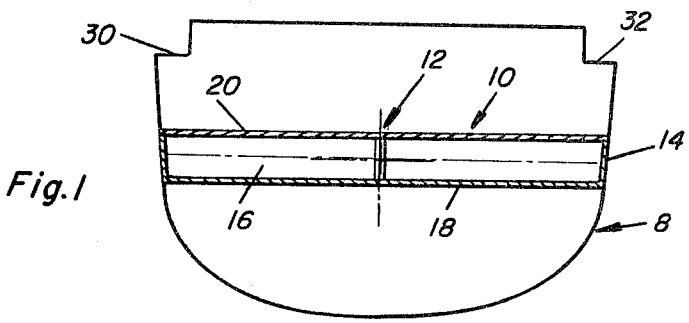
Fig.1
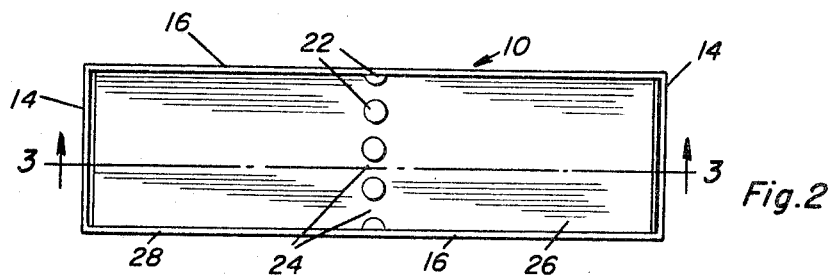
Fig.2
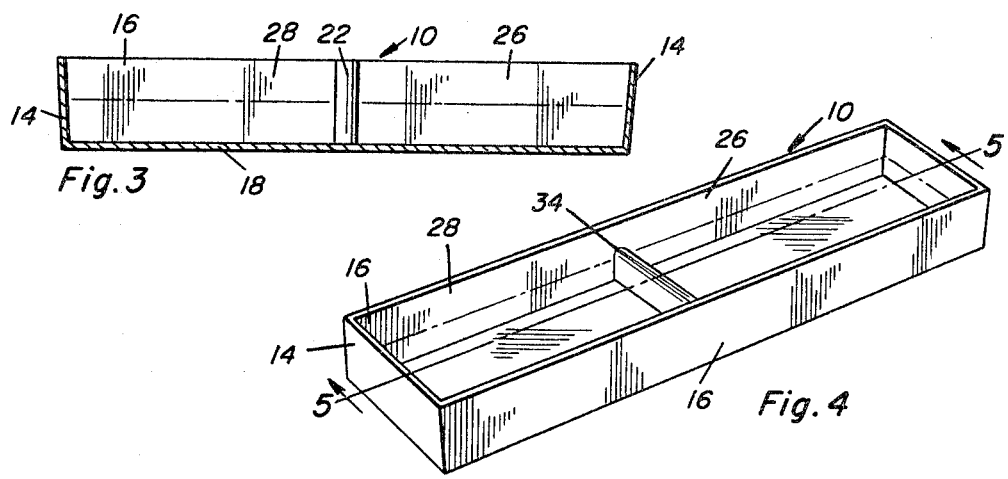
Fig.3
Fig.4
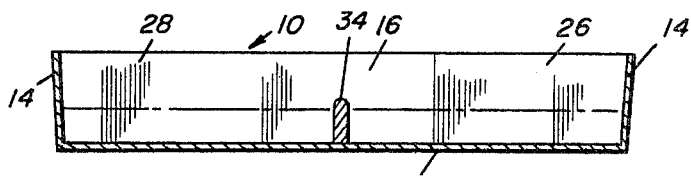
Fig.5
Sheldon B. Field  INVENTORS
Thomas F. Bridges
Edward V. Lewis
Lawrence W. Ward
BY
Stevens, Davis, Miller + Mosher
ATTORNEYS

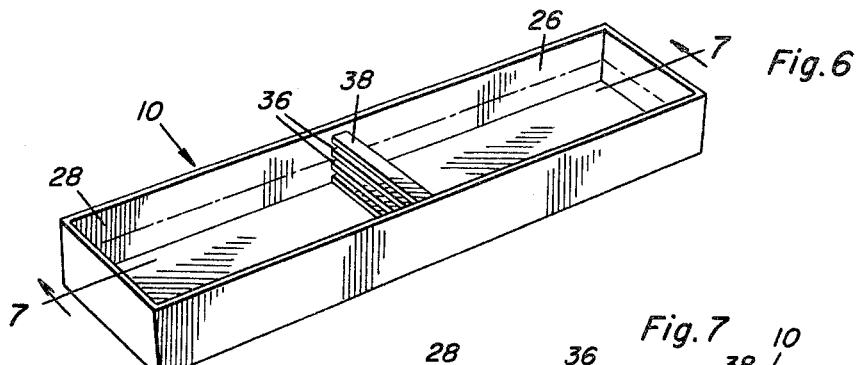
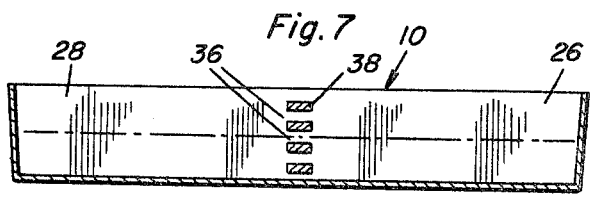
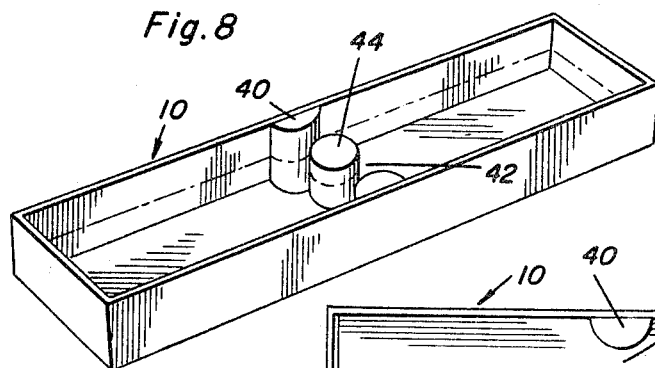
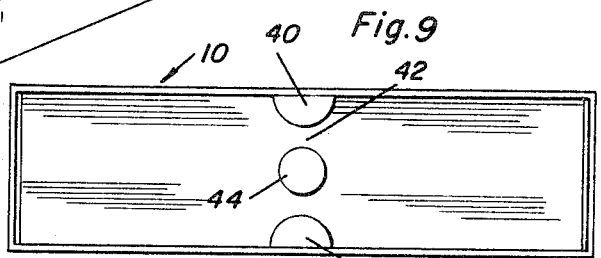
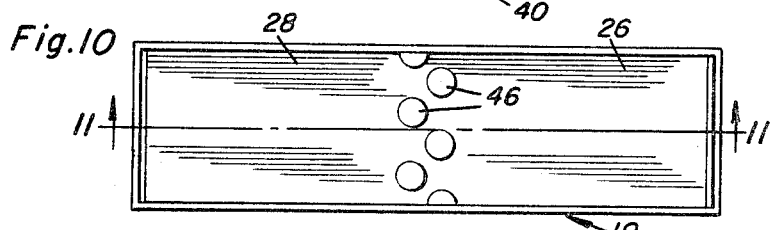
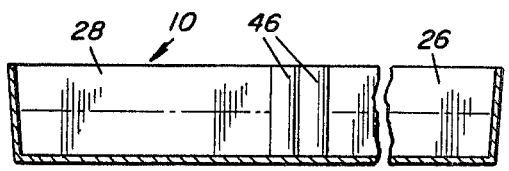
Sheldon B. Field
Thomas F. Bridges
Edward V. Lewis
Lawrence W. Ward
INVENTORS
BY Stevens, Davis, Miller & Mosher
ATTORNEYS Sheldon B. Field
Thomas F. Bridges
Edward V. Lewis
Lawrence Ward
INVENTORS

United States Patent Office 3,282,239
Patented Nov. 1, 1966

3,282,239
PASSIVE SHIP STABILIZATION SYSTEM USING DAMPING ALONG CENTER LINE ONLY
Sheldon B. Field, Floral Park, Thomas F. Bridges, Port Washington, Edward V. Lewis, Glen Head, and Lawrence W. Ward, Glen Cove, N.Y., assignors to John J. McMullen Associates, Incorporated, New York, N.Y., a corporation of New York
Filed July 30, 1964, Ser. No. 386,196
9 Claims. (Cl. 114—125)

This invention relates to a passive ship stabilization system and more particularly a stabilization system using an elongated fluid storage means and means mounted along the center line thereof for damping the kinetic energy of fluid moving therethrough.

There have been many advancements in the passive stabilization system for water going vessels, and it is now known that these passive stabilization systems are practical for use. However, systems in use today rely on an elongated liquid storage means which is divided into three or more compartments with damping means such as nozzles or restricted openings, disposed at two locations along the longitudinal dimension of said liquid containing means. It has been discovered that sufficient stabilization can be obtained by a system which uses only one damping means which divides the tank into only two compartments. With this arrangement the system is further simplified, reduced in cost, and more quickly and easily installed in the vessel without any sacrifice in the effectiveness of the system.

It is therefore an object of the present invention to provide an improvement over the three or more compartmented passive systems by providing only one damping means located along the longitudinal center line of the passive system.

It is a further object of the present invention to provide a passive stabilization system for water going vessels which comprises only two compartments.

It is still a further object of the present invention to provide a two-compartmented elongated passive stabilization system wherein damping is only provided at the connection between the two compartments for damping the kinetic energy of fluid moving from one compartment to the other compartment.

It is a still further object of the present invention to provide a two-compartmented passive stabilization system wherein a substantial amount of liquid is enabled to pass from one compartment to the other through a central energy damping means so that the maximum moment can be imparted to the ship in opposition to the roll thereof.

It is a still further object of the present invention to provide a two-compartmented passive stabilization system wherein there is substantial cooperation between the compartments, that is, a substantial amount of liquid within the system is enabled to pass from one compartment to the other to produce the maximum opposing moment.

Other and further objects of the present invention will become apparent with the following detailed description in view of the appended drawings in which:

FIG. 1 is a schematic representation of a hull of a ship showing the stabilization system mounted therein;

FIG. 2 is a top plan view of one embodiment of the present invention;

FIG. 3 is a side elevation in section taken along line 3—3 of FIG. 2;

FIG. 4 is a perspective view of another embodiment of the present invention;

FIG. 5 is a side elevation taken in section along line 5—5 of FIG. 4;

FIG. 6 is a perspective view of yet another embodiment of the invention;

FIG. 7 is a side elevation taken in section along line 7—7 of FIG. 6;

FIG. 8 is a perspective view of still another embodiment of the present invention;

FIG. 9 is a top plan view of the embodiment shown in FIG. 8;

FIG. 10 is a top plan view of yet another embodiment of the present invention;

FIG. 11 is a side elevation taken in section along line 11—11 of FIG. 10; and

Figure 12:
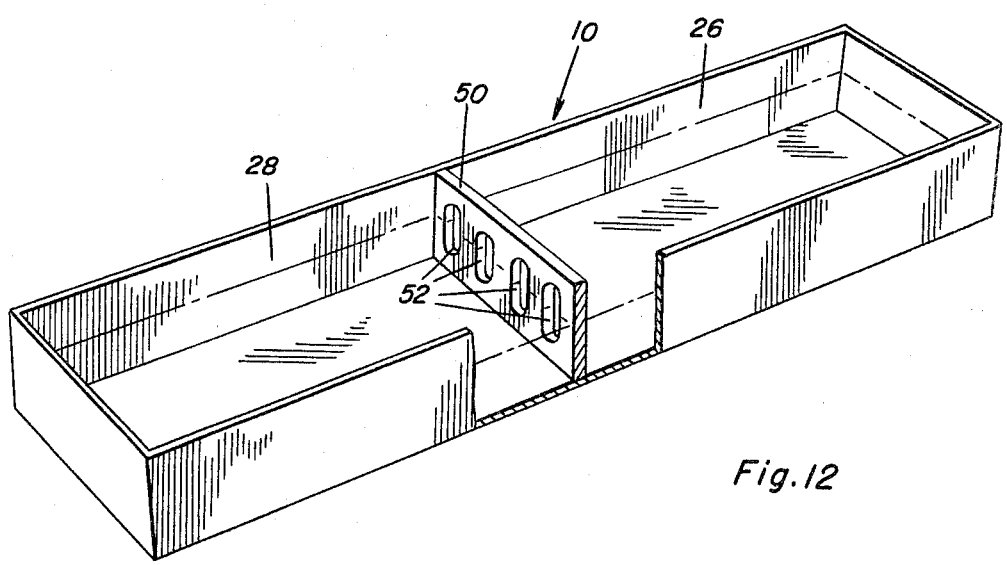
FIG. 12 is a perspective view of another embodiment of the invention.

All embodiments of the present invention comprise an elongated tank or fluid storage means and energy damping means mounted transversely substantially at the center line of the tank to divide the tank into two communicating compartments. The system is characterized by the fact that a body of water within the storage means would assume a free surface condition throughout the tank and by the fact that there is substantial cooperation between the two compartments for creating the restoring moment in response to the roll of the ship. This cooperation is defined by the design of the system to enable a substantial amount of liquid in one compartment to flow past the energy damping means into the other compartment in response to the roll of the ship so that the maximum restoring moment can be imparted to the ship. Thus, the design and operation of the system relies on the cooperation of the compartments or the transfer of liquid from one compartment to the other to establish a restoring moment.

Referring now to FIG. 1, a passive stabilization tank generally indicated as 10 is disposed athwartship of ship 8. Tank 10 is defined by end walls 14, side walls 16, bottom 18, and top 20. Bottom 18 and top 20 can comprise two spaced decks of ship 8 with the walls mounted or welded therebetween. Energy damping means generally indicated as 12 is located substantially along the longitudinal center line of tank 10. With this arrangement, stabilizer 10 extends substantially from one side of the ship to the other and provides stabilization against roll. By extending the stabilizer across the hull of the ship, the maximum moment arm for the liquid can be obtained. The stabilizer is proportioned in a manner such that the weight of liquid displaced in a position adjacent to an end portion thereof is sufficient to generate a restoring moment capable of opposing the motion of the ship for a range of sea conditions. The fluid within the tank has a free surface and can move in response to the motion of the ship, and the natural frequency of the system can be tuned to that of the ship by varying the static level of liquid within tank 10.

For purposes of clarity, the embodiments shown in FIGS. 2–11 are illustrated without tops so that the tank interior can be clearly shown.

Referring now to the embodiment of the invention shown in FIGS. 2 and 3, there is illustrated an elongated stabilization tank 10 with the energy damping means comprising a row of upstanding pipes 22 mounted laterally across the tank 10 substantially at the center line thereof. Said pipes 22 preferably extend the full height of tank 10 and define a plurality of nozzles or openings 24. Pipes 22 divide the tank 10 into two compartments 26 and 28 and the nozzles 24 enable communication therebetween. A body of liquid is placed in the tank 10 and has its upper surface in a free and unconfined condition.

The fluid to be employed within the stabilizer can be any liquid having sufficient density and with a viscosity of a sufficient low magnitude so that flow can readily take place between and pass through the fluid impedance means or nozzles 24. Liquids such as sea water, fresh water, bunker oil or types of liquid cargo can be used in the stabilizer tank. Once the stabilizer has been designed and installed within the ship, the depth of fluid within the stabilizer can be varied for tuning the stabilizer for various conditions of the sea and ship.

In order for a restoring moment to be generated, it is necessary that the moment be substantially out of phase with the forces applied to the ship by the sea. Thus, in the case of roll, as the crest of a wave strikes along side 30 of the ship in FIG. 1, the force resulting from the stabilizing moment must be applied in opposition to the force of the wave. Thus, as the forces of the sea and the natural frequency of roll of the ship cause side 30 of the ship to rise and side 32 of the ship to be lowered, the system is designed to have the maximum accumulation of liquid within compartment 28 and the least amount of liquid within compartment 26 to create an opposing moment to the rolling forces of the ship. Similarly, when side 32 of the ship is down, there will be an accumulation of fluid within compartment 26 and a decrease in the amount of fluid within compartment 28 to oppose the inevitable rising of side 32 and lowering of side 30.

The forces imparted to the ship by the sea are therefore transferred into potential and kinetic energy of the fluid within the tank stabilization system. This energy must be dissipated so that the energy within the system cannot aid in the rolling of the ship in any way. Therefor, when the energy is in the form of kinetic energy (a moving fluid mass), the kinetic energy will be dissipated as the fluid passes through nozzles 24 defined by pipes 22. Therefore, it can be seen that the fluid energy is dampened by nozzles 24 but that the air or gas located above the fluid surface is not throttled or controlled in any way and is enabled to freely pass between the compartments. If desired, the air space located above the liquid surface can communicate with the atmosphere by any conventional means.

It can be seen that the vertical disposition of nozzle 24 enables an automatically variable amount of damping in response to the instantaneous height of fluid at the nozzle. The greater the height of fluid at a nozzle, the greater the cross-sectional area through which the fluid flows, and consequently, the less the damping would be.

Referring now to the embodiment shown in FIGS. 4 and 5, there is illustrated a two-compartmented stabilization tank 10, the compartments being defined by a weir or hydraulic jump 34 mounted laterally across the bottom of tank 10. Again, a body of fluid having a free surface condition is disposed within tank 10 and a substantial amount of liquid transfer takes place between the compartments 26 and 28 in response to the roll of the ship. As fluid is transferred from one compartment to the other, a substantial impedance is experienced therein due to the jump or weir 34. The operation of the system is substantially the same as that described above.

In the embodiment shown in FIGS. 6 and 7, tank 10 is divided into two compartments 26 and 28 by the horizontally arranged nozzles 36 defined by horizontally and transversely disposed bars 38. If desired, pipes similar to pipes 22 shown in FIG. 2 can be used in place of bars 38. As liquid transfer takes place between compartments 26 and 28, the kinetic energy found therein is dampened by the nozzles or restrictions 36 in the same manner as described for the nozzle arrangement shown in FIGS. 2 and 3. The operation of the overall system is substantially the same as that described above.

The embodiment shown in FIGS. 8 and 9 has damping means which comprise two upstanding enlarged projections substantially semicylindrical in shape and mounted on either side wall of tank 10. Projections 40 define a restricted nozzle 42 which has its throat or vertical dimension greater than its transverse dimension. As liquid is transferred from one compartment to the other through nozzle 42, the vena contracta effect will further restrict the opening so that greater damping will take place.

If desired, a vertically disposed pipe 44 can be mounted substantially in the center of nozzle 42 so that the vena contracta effect will be more substantial and will take place at two locations within opening 42.

In the embodiment shown in FIGS. 10 and 11, tank 10 is compartmented by damping means which comprise at least two rows of staggered pipes 46 having a vertical disposition and mounted transversely across tank 10. As fluid is transferred from compartment 26 to compartment 28, a portion of the kinetic energy therein is dissipated by the openings or passageways defined by pipes 46. These openings or passageways cause the liquid transferring therethrough to assume a tortuous path, thus dissipating a portion of the kinetic energy thereof and reducing the pressure head in accordance with the design of the system. If desired, more than two transverse staggered rows of pipes 46 may be used across the center of tank 10.

Referring now to the embodiment shown in FIG. 12, there is illustrated an elongated liquid tank 10 having a longitudinal axis and moving liquid energy damping means mounted in the center thereof. Said damping means comprises and upstanding plate 50 mounted transversely across tank 10 in the center thereof. Plate 50 is of heavy construction and has a plurality of elongated holes or slots 52 cut therein. Slots 52 are spaced laterally across said plate 50 and provide for substantial communication of liquid between one compartment and the other compartment of said tank 10. It is desirable but not necessary that the tank be designed so that the static liquid level of the body of liquid within tank 10 be substantially halfway up the vertical dimension of slots 52.

The operation of the system shown in FIG. 12 is substantially the same as that described above, and the kinetic energy of the moving fluid transferred from one compartment to the other will be dissipated to some extent by damping means 50 in accordance with the design of the system.

Thus, there has been described a simple, economical, effective, passive stabilization system for water going vessels, said system comprising only two compartments and a single energy damping means mounted therebetween. It is to be understood that other and further modifications can be made to the presently disclosed system without departing from the spirit of this invention. The invention, therefore, should only be limited by the scope of the appended claims.

What is claimed is:

1. A passive stabilization system for water going vessels comprising an elongated liquid storage means having a longitudinal axis mounted in the roll plane of the vessel, damping means mounted within said liquid storage means at the longitudinal center region thereof, said storage means being substantially free of damping means throughout its length except for the said damping means at the center region thereof so that said damping means and liquid storage means define only two communicating compartments within said liquid storage means, a body of liquid partially filling said storage means so that an air space is provided above the surface of the liquid body, said body of liquid having a height such that the oscillations of the entire body are tuned to the oscillations of the vessel, said damping means enabling a substantial amount of liquid transfer to take place from one of said compartments to the other of said compartments in response to the roll of the vessel so that the timed accumulation of liquid in one compartment and reduction of liquid from the other compartment imparts a stabilizing moment to the vessel.

2. A passive stabilization system as set forth in claim 1, wherein said damping means comprises a row of upwardly disposed pipes spaced from each other laterally across said liquid storage means, said pipes defining a plurality of upward, elongated openings through which the liquid body transfers.

3. A passive stabilization system as set forth in claim 1, wherein said damping means comprises a weir mounted laterally across said liquid storage means, said weir having a height substantially less than the height of said liquid storage means.

4. A passive stabilization system as set forth in claim 1, wherein said damping means comprises a plurality of bars, said bars being spaced upwardly from each other, said plurality of bars mounted transversely across said liquid storage means, said bars defining horizontally disposed elongated nozzles.

5. A passive stabilization system as set forth in claim 1, wherein said damping means comprises a pair of upstanding semicylindrical members mounted on said sides of said liquid storage means, said semicylindrical members defining a nozzle having a vertical dimension greater than the horizontal dimension thereof.

6. A passive stabilization system as set forth in claim 5, said system further comprising an upstanding pipe mounted in said liquid storage means substantially in the center of said nozzle defined by said semicylindrical members, and wherein said semicylindrical members and said pipes extend substantially the full height of said liquid storage means.

7. A passive stabilization system as set forth in claim 1, wherein said damping means comprises at least two rows of pipes spaced from each other and staggered with respect to respective pipes in the other row so that said pipes define tortuous communicating paths between each of said compartments.

8. A passive stabilization system as set forth in claim 1, wherein said energy damping means comprises an upstanding plate mounted transversely across said liquid storage means, said plate defining a plurality of elongated slots, each slot having a vertical dimension substantially greater than its lateral dimension, said slots being spaced from each other to define a plurality of communicating paths whereby substantial liquid transfer can take place from one side of said liquid storage means to the other side of said liquid storage means through said elongated slots.

9. A passive system as set forth in claim 7, wherein said pipes extend upward and wherein the pipes in each row are spaced laterally from each other.

References Cited by the Examiner
UNITED STATES PATENTS
3,054,373   9/1962   Ripley _____ 114—125
FOREIGN PATENTS
688,796   3/1940   Germany.

MILTON BUCHLER, Primary Examiner.
T. M. BLIX, Assistant Examiner.